US010852919B2

United States Patent
Hatazawa et al.

(10) Patent No.: US 10,852,919 B2
(45) Date of Patent: Dec. 1, 2020

(54) TOUCH INPUT JUDGMENT DEVICE, TOUCH PANEL INPUT DEVICE, TOUCH INPUT JUDGMENT METHOD, AND A COMPUTER READABLE MEDIUM

(71) Applicant: MITSUBISHI ELECTRIC CORPORATION, Tokyo (JP)

(72) Inventors: Hikaru Hatazawa, Tokyo (JP); Toshiyuki Hagiwara, Tokyo (JP); Daisuke Kisara, Tokyo (JP); Takuya Maekawa, Tokyo (JP); Yuichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/622,049

(22) PCT Filed: Jun. 20, 2017

(86) PCT No.: PCT/JP2017/022668
§ 371 (c)(1),
(2) Date: Dec. 12, 2019

(87) PCT Pub. No.: WO2018/235158
PCT Pub. Date: Dec. 27, 2018

(65) Prior Publication Data
US 2020/0210036 A1    Jul. 2, 2020

(51) Int. Cl.
*G06F 3/0484* (2013.01)
*G06F 3/0488* (2013.01)
*G06F 3/041* (2006.01)

(52) U.S. Cl.
CPC .......... *G06F 3/0484* (2013.01); *G06F 3/0418* (2013.01); *G06F 3/0488* (2013.01)

(58) Field of Classification Search
CPC .... G06F 3/0484; G06F 3/0418; G06F 3/0488; G06F 3/041
See application file for complete search history.

(56) References Cited

U.S. PATENT DOCUMENTS 9,513,798 B2 * 12/2016 Helmes ............... G06F 3/04883
10,552,016 B2 * 2/2020 Cherna ................ G06F 3/0482
(Continued)

FOREIGN PATENT DOCUMENTS

EP   2 159 183 A1   3/2010
JP   5456529 B2     4/2014
(Continued)

OTHER PUBLICATIONS

German Office Action, dated Sep. 14, 2020, for German Application No. 112017007545.9 with an English translation.

*Primary Examiner* — Andrew Sasinowski
(74) *Attorney, Agent, or Firm* — Birch, Stewart, Kolasch & Birch, LLP

(57) ABSTRACT

A touch input judgment device includes: a rotation direction judgment unit that determines a selection value change amount, to be added to a current selection value, when a rotation operation in a normal direction is inputted through a touch panel and stores rotation direction information in a storage unit when a rotation operation in the normal direction as a first rotation operation is performed; and a selection value change unit that sets a new current selection value after a change to a value obtained by adding a first selection value change amount to the current selection value when a rotation operation subsequent to the first rotation operation is a rotation operation in the normal direction and maintains the current selection value without change when the subsequent rotation operation is judged to be the return operation of the finger position.

8 Claims, 12 Drawing Sheets

(56) References Cited

U.S. PATENT DOCUMENTS

2006/0026521 A1   2/2006  Hotelling et al.
2012/0144345 A1   6/2012  Munter et al.
2017/0052694 A1*  2/2017  Du ..................... G06F 3/04883

FOREIGN PATENT DOCUMENTS

WO   WO 2008/155836 A1   12/2008
WO   WO 2016/035207 A1   3/2016

\* cited by examiner

CLOCKWISE ROTATION OPERATION WITH LEFT HAND (TWO FINGERS)

COUNTERCLOCKWISE ROTATION OPERATION WITH LEFT HAND (TWO FINGERS)

CLOCKWISE ROTATION OPERATION WITH RIGHT HAND (TWO FINGERS)

COUNTERCLOCKWISE ROTATION OPERATION WITH RIGHT HAND (TWO FINGERS)

| No | x COORDINATE | y COORDINATE | VELOCITY v | MOVING DIRECTION θ | TIME t |
|---|---|---|---|---|---|
| 1 | $x_1$ | $y_1$ | $v_1$ | $θ_1$ | $t_1$ |
| 2 | $x_2$ | $y_2$ | $v_2$ | $θ_2$ | $t_2$ |
| 3 | $x_3$ | $y_3$ | $v_3$ | $θ_3$ | $t_3$ |
| 4 | $x_4$ | $y_4$ | $v_4$ | $θ_4$ | $t_4$ |
| ⋮ | ⋮ | ⋮ | ⋮ | ⋮ | ⋮ |
| n | $x_n$ | $y_n$ | $v_n$ | $θ_n$ | $t_n$ |

TOUCH INPUT JUDGMENT DEVICE, TOUCH PANEL INPUT DEVICE, TOUCH INPUT JUDGMENT METHOD, AND A COMPUTER READABLE MEDIUM

TECHNICAL FIELD

The present invention relates to a touch input judgment device, a touch panel input device, a touch input judgment method and a touch input judgment program for outputting a selection value corresponding to operation information inputted by means of a touch operation on a touch panel.

BACKGROUND ART

In general, the user of a touch panel performs a touch operation as an input operation on the touch panel while viewing an operation object (display component) displayed on a GUI (Graphical User Interface) screen of the touch panel. However, there is a demand for a device that allows the user to perform the touch operation (referred to also as a touch gesture operation) without viewing the touch panel.

For example, Patent Reference 1 describes a method of designating a destination floor number by inputting a number representing a destination floor of an elevator (destination floor number) by means of handwriting on a touch panel.

Further, a method that eliminates troublesomeness of inputting numbers by means of handwriting is described in Patent Reference 2. This reference describes a method in which the user performs a virtual knob rotation operation (dial operation) on a touch panel by using two fingers in order to control a virtual knob (virtual dial) displayed on the touch panel and thereby increases or decreases a value representing a sound level (selection value). The user increases the sound level by performing a clockwise rotation operation with the fingers to rotate the virtual knob clockwise, or decreases the sound level by performing a counterclockwise rotation operation with the fingers to rotate the virtual knob counterclockwise.

In general, the user performing the rotation operation on a touch panel finds it easy to perform the clockwise rotation operation (CW operation as a clockwise operation) rather than the counterclockwise rotation operation (CCW operation as a counterclockwise operation) when performing the rotation operation with the right hand, and finds it easy to perform the counterclockwise rotation operation rather than the clockwise rotation operation when performing the rotation operation with the left hand.

Further, since the number of right-handed people is greater than the number of left-handed people, various types of devices are generally designed according to rules on the assumption that the device is operated with the right hand. For example, in the case of a sound level adjustment knob, the clockwise rotation operation is the operation for increasing the sound level and the counterclockwise rotation operation is the operation for decreasing the sound level. According to this rule, when the designation of the destination floor number of an elevator (selection value) is implemented by the rotation operation (dial operation) on the touch panel, the clockwise rotation operation is the operation for increasing the destination floor number (selection value) and the counterclockwise rotation operation is the operation for decreasing the destination floor number (selection value).

For example, when it is necessary to perform a normal direction rotation operation (e.g., clockwise rotation operation) multiple times to select the destination floor number, there exists a return operation as a reverse direction rotation operation of moving the fingers in a reverse direction (i.e., finger movement without the purpose of information input) between the first normal direction rotation operation and the subsequent normal direction rotation operation. This return operation has to be performed in a state in which the fingers are separate from the touch panel, namely, in a state in which the number of fingers in contact with the touch panel is one or less (e.g., a pivot finger as the rotation center may be in contact with the touch panel).

PRIOR ART REFERENCE

Patent Reference
  Patent Reference 1: International Publication WO 2008/155836
  Patent Reference 2: Japanese Patent No. 5456529

SUMMARY OF THE INVENTION

Problem to be Solved by the Invention

However, when the normal direction rotation operation is repeatedly performed multiple times to select the destination floor number, there are cases where the return operation as the reverse direction rotation operation is performed while keeping a plurality of fingers in contact with the touch panel. In such cases, there is a problem in that the return operation without the purpose of information input is recognized as the reverse direction rotation operation for decreasing (or increasing) the destination floor number and the destination floor number that has been increased (or decreased) by the immediately previous normal direction rotation operation decreases (or increases) unexpectedly.

The object of the present invention, which has been made to resolve the above-described problem, is to provide a touch input judgment device, a touch panel input device, a touch input judgment method and a touch input judgment program that make it possible to easily and quickly input the selection value even when the normal direction rotation operation is repeatedly performed multiple times.

Means for Solving the Problem

A touch input judgment device according to an aspect of the present invention is a touch input judgment device that changes a selection value based on a touch operation on a touch panel, and includes: a storage unit; a rotation direction judgment unit that determines a selection value change amount, to be added to a current selection value, when a rotation operation in a normal direction is inputted through the touch panel and stores rotation direction information indicating the normal direction in the storage unit when a rotation operation in the normal direction as a first rotation operation is performed; a reverse-rotation direction judgment unit that judges that a rotation operation subsequent to the first rotation operation is a return operation of a finger position when the subsequent rotation operation is a finger movement in a direction reverse to the direction indicated by the rotation direction information; a selection value change unit that sets a new current selection value after a change to a value obtained by adding the selection value change amount to the current selection value when the subsequent rotation operation is a rotation operation in the normal direction and maintains the current selection value without change when the subsequent rotation operation is judged to be the return operation of the finger position; and a selection value determination unit that determines the current selection value according to the touch operation on the touch panel.

Effect of the Invention

According to the present invention, an advantage is obtained in that the selection value can be inputted easily and quickly even when the normal direction rotation operation is repeatedly performed multiple times.

MODE FOR CARRYING OUT THE INVENTION

Touch input judgment devices, touch panel input devices, touch input judgment methods and touch input judgment programs according to embodiments of the present invention will be described below with reference to the accompanying drawings. The following embodiments are just examples and a variety of modifications are possible within the scope of the present invention.

The touch panel input device according to each embodiment includes a touch panel having a screen for the touch operation (i.e., an operation screen) and a touch input judgment device that receives operation information corresponding to the touch operation on the touch panel. The touch input judgment device outputs output information (e.g., a selection value) corresponding to the operation information inputted through the touch operation on the touch panel. The touch input judgment device or the touch panel input device according to each embodiment is installed in a system (e.g., facility or equipment) and is capable of changing a selection value supplied to the system into a new current selection value. Here, the system is an elevator system, for example, and the selection value is a numerical value representing a destination floor. However, the system may also be a system other than an elevator system (e.g., audio equipment or the like) and the selection value may also be a numerical value representing information other than the destination floor (e.g., numerical value representing a sound level or the like).

(1) First Embodiment (1-1) Configuration

Figure 1:
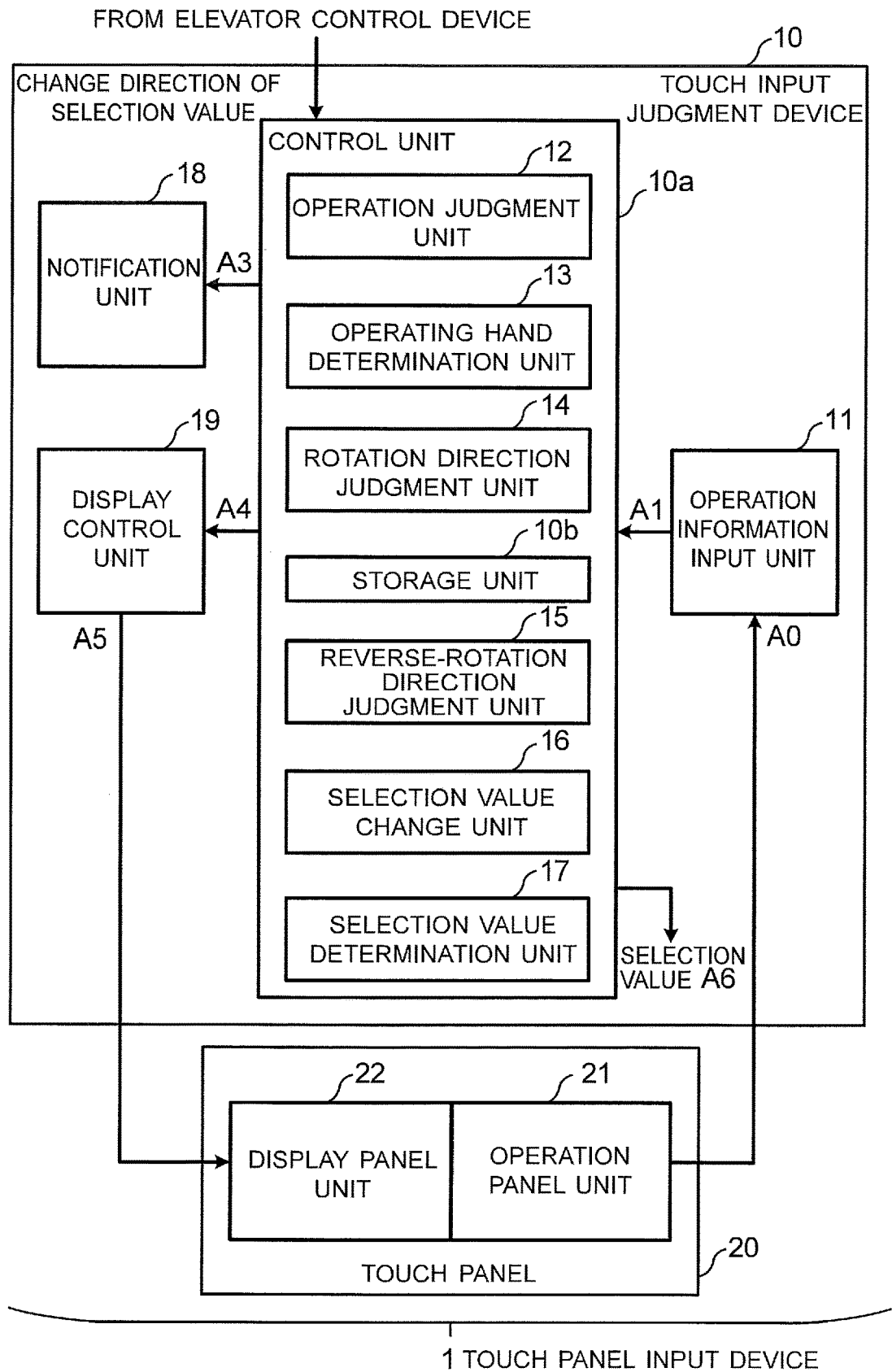
FIG. 1 is a functional block diagram schematically showing the configuration of a touch panel input device (including a touch input judgment device) according to a first embodiment of the present invention.

FIG. 1 is a functional block diagram schematically showing the configuration of a touch panel input device 1 (including a touch input judgment device 10) according to a first embodiment of the present invention.

As shown in FIG. 1, the touch panel input device 1 includes the touch input judgment device 10 and a touch panel 20. The touch panel 20 includes an operation panel unit (user operation unit) 21 that receives a touch operation performed by a user and a display panel unit (display device) 22 arranged to be superimposed on the operation panel unit 21 and presenting an operation screen and the like to the user. The touch input judgment device 10 is a device capable of executing a touch input judgment method according to the first embodiment. Further, the touch input judgment device 10 is a device capable of executing a touch input judgment program according to the first embodiment. The touch input judgment program can be executed by a computer and can be stored in an information recording medium (optical disc, magnetic disc, etc.) to be readable.

In the first embodiment, the description will be given of a case where the present invention is applied to a destination floor registration device for setting a destination floor number of an elevator system. In this case, the touch panel input device 1 is provided in the cage of an elevator and used by a user as a passenger of the elevator. However, it is also possible to provide the touch panel 20 in the cage of an elevator and install the touch input judgment device 10 in an elevator control device that is a facility outside the cage of the elevator.

As shown in FIG. 1, the touch input judgment device 10 includes an operation information input unit 11 that receives operation information A0 supplied from the operation panel unit 21 of the touch panel 20 on which the touch operation has been performed, a control unit 10a that receives a signal A1 based on the operation information A0 supplied from the operation information input unit 11 and changes and determines the selection value A6 based on the signal A1, a notification unit 18 that outputs an audio signal, based on notification information A3 supplied from the control unit 10a, to a speaker as an audio output device (43 in FIG. 2 which will be explained later), and a display control unit 19 that supplies an image signal A5, based on image information A4 supplied from the control unit 10a, to the display panel unit (display device) 22 of the touch panel 20.

The control unit 10a includes an operation judgment unit 12, an operating hand determination unit 13, a rotation direction judgment unit 14, a reverse-rotation direction judgment unit 15, a selection value change unit 16, a selection value determination unit 17 and a storage unit 10b. The operation judgment unit 12 may also have a function as an operation type judgment unit that judges whether the touch operation is in a display component operation mode in regard to a display component displayed on the touch panel 20 or in a whole screen operation mode in which the whole area of the touch panel 20 is used as an operation region.

The operation information input unit 11 receives the operation information A0 based on the touch operation performed on the touch panel 20 by the user and supplies the signal A1 based on the operation information A0 to each functional block of the control unit 10a.

The operation judgment unit 12 receives the signal A1 supplied from the operation information input unit 11 and judges a type and an operation amount of the touch operation performed by the user based on the signal A1. The type of the touch operation can be a tap, a double tap, a rotation operation, etc., for example. Here, the tap is an operation of lightly hitting the operation screen of the touch panel 20 with a finger, and the double tap is an operation of lightly hitting the operation screen of the touch panel 20 with a finger twice. The rotation operation is an operation of moving two fingers on the operation screen (whole screen) of the touch panel 20 so as to draw a circle. Examples of the rotation operation are shown in FIGS. 6(a) to 6(d) which will be explained later. The operation amount of the rotation operation is, for example, a rotation angle of the fingers moved on the touch panel 20 so as to draw a circle. This rotation angle is a change amount from an angle at the start of the rotation to an angle at the end of the rotation in the rotation operation, namely, an angle formed by a first straight line connecting a rotation center (pivot finger) and a start point position (moving finger) as a rotation start point and a second straight line connecting the rotation center (pivot finger) and an end point position (moving finger) as a rotation end point. Incidentally, the rotation operation performed with two fingers is an operation of drawing a circle by moving two fingers on the touch panel 20 in directions different from each other or an operation of drawing a circle by moving one finger while fixing the other finger at the central position of the circle. Further, the rotation operation may also be performed with three or more fingers, and in such cases, the rotation operation with three or more fingers can be handled as a rotation operation with two fingers that are the most separate, for example.

The operating hand determination unit 13 determines whether the user's subsequent touch operation (rotation operation as a selection value changing touch operation) will be performed with the right hand or the left hand, that is, whether the operating hand to be used by the user for the rotation operation is the right hand or the left hand, based on the touch operation performed on the operation screen of the touch panel 20 by the user.

The rotation direction judgment unit 14 determines a counterclockwise rotation change amount LADD as a selection value change amount in the case of the rotation operation of counterclockwise rotation as a rotation operation performed by the user and a clockwise rotation change amount RADD as the selection value change amount in the case of the rotation operation of clockwise rotation as a selection value changing rotation operation based on operating hand information indicating whether the operating hand determined by the operating hand determination unit 13 is the left hand or the right hand and information indicating a change direction of the selection value inputted from equipment or a facility outside the touch panel input device 1. In the first embodiment, the information on the change direction of the selection value is information on a destination direction (upper floor or lower floor) specified at a boarding point of the elevator. Each of the counterclockwise rotation change amount as the selection value change amount in the case of the rotation operation of counterclockwise rotation and the clockwise rotation change amount as the selection value change amount in the case of the rotation operation of clockwise rotation is a change amount of the floor number.

Figure 2:
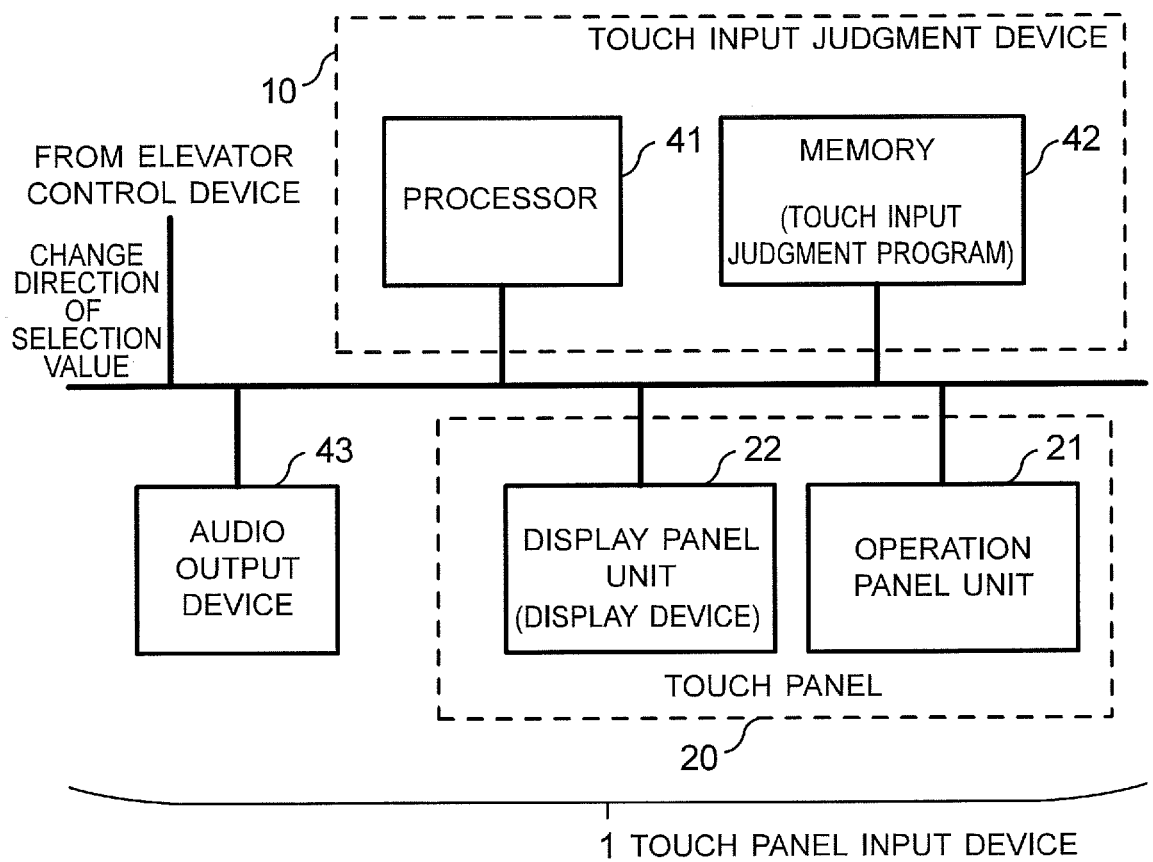
FIG. 2 is a diagram showing the hardware configuration of the touch panel input device (including the touch input judgment device) according to the first embodiment.

Further, when a rotation operation is inputted for the first time, the rotation direction judgment unit 14 stores rotation direction information indicating the rotation direction of the rotation operation in the storage unit 10b (e.g., memory 42 in FIG. 2). The storage unit 10b may also be provided outside the control unit 10a. The rotation direction indicated by the stored rotation direction information will be referred to as a "normal direction".

When a normal direction rotation operation is repeated multiple times, if there exists a rotation operation (finger movement) in a direction reverse to the rotation direction (normal direction) indicated by the rotation direction information stored in the storage unit 10b, the reverse-rotation direction judgment unit 15 judges that the rotation direction of the rotation operation is a reverse direction.

The selection value change unit 16 judges whether the rotation operation is counterclockwise rotation or clockwise rotation and generates a new current selection value by adding the selection value change amount RADD or LADD to the current selection value. In the first embodiment, the selection value is the destination floor number.

Further, when the rotation operation subsequent to the first normal direction rotation operation is a normal direction rotation operation in the rotation direction indicated by the rotation direction information, the selection value change unit 16 generates a new current selection value by adding the selection value change amount RADD or LADD to the current selection value. When the rotation operation subsequent to the first normal direction rotation operation is a rotation operation in the direction reverse to the rotation direction indicated by the rotation direction information (reverse direction rotation operation), the selection value change unit 16 maintains the current selection value without performing the process of adding the selection value change amount RADD or LADD to the current selection value, and updates initial position information to be used for the calculation of the selection value change amount to a touch position at the end of the reverse direction rotation operation.

When the current selection value is changed by the selection value change unit 16 to a new current selection value after the change, the display control unit 19 changes the display on the operation screen from the current selection value before the change to the new current selection value after the change. In the first embodiment, the display control unit 19 transmits an image signal to the touch panel 20 and a liquid crystal monitor or the like displaying the destination floor of the elevator.

When the current selection value is changed by the selection value change unit 16 to a new selection value after the change, the notification unit 18 transmits an audio signal for notifying of the selection value by means of sound to the audio output device (audio output unit). The notification unit 18 may also output an audio signal for outputting a sound indicating the rotation operation (e.g., sound imitating a dial rotation sound of a telephone) during the rotation operation performed with fingers.

When the operation judged based on the operation information inputted from the operation information input unit 11 is the double tap, the selection value determination unit 17 determines the new current selection value after the change obtained by the selection value change unit 16 as a new current selection value. In the first embodiment, the selected floor of the elevator is determined as the destination floor. Incidentally, the operation for determining the selection value may also be an operation other than the double tap.

In the touch input judgment device 10, the rotation direction judgment unit 14 determines the selection value change amount (RADD, LADD) to be added to the current selection value when a rotation operation in the normal direction is inputted through the touch panel 20, and stores the rotation direction information indicating the normal direction in the storage unit 10b when the rotation operation in the normal direction as the first rotation operation is performed. When the rotation operation subsequent to the first rotation operation is a finger movement in the direction reverse to the direction indicated by the rotation direction information, the reverse-rotation direction judgment unit 15 judges that the subsequent rotation operation is a return operation of a finger position. When the subsequent rotation operation is a rotation operation in the normal direction, the selection value change unit 16 sets a new current selection value after the change to a value obtained by adding the selection value change amount (RADD, LADD) to the current selection value. When the subsequent rotation operation is judged to be the return operation of the finger position, the selection value change unit 16 maintains the current selection value without change. The selection value determination unit 17 determines (finalizes) the current selection value and clears (resets) the rotation direction information stored in the storage unit 10b according to an operation on the touch panel 20 (e.g., touch operation) other than the rotation operation. Incidentally, the normal direction is a direction coinciding with the change direction of the selection value inputted from the outside.

FIG. 2 is a diagram showing the hardware (H/W) configuration of the touch panel input device 1 according to the first embodiment. The touch panel 20 is capable of detecting contact of a plurality of fingers and generating the operation information (identification information on each finger, coordinate information on contact positions of fingers, information indicating contact conditions of fingers, etc.). A processor 41 executes a program (touch input judgment program) as software stored in a memory 42, and thereby the function of each component of the touch input judgment device 10 is implemented. The display device 22 performs an operation according to a command from the processor 41, and thereby the display control unit 19 is implemented. The audio output device 43 performs an operation according to a command from the processor 41, and thereby the notification unit 18 is implemented.

Figure 3:
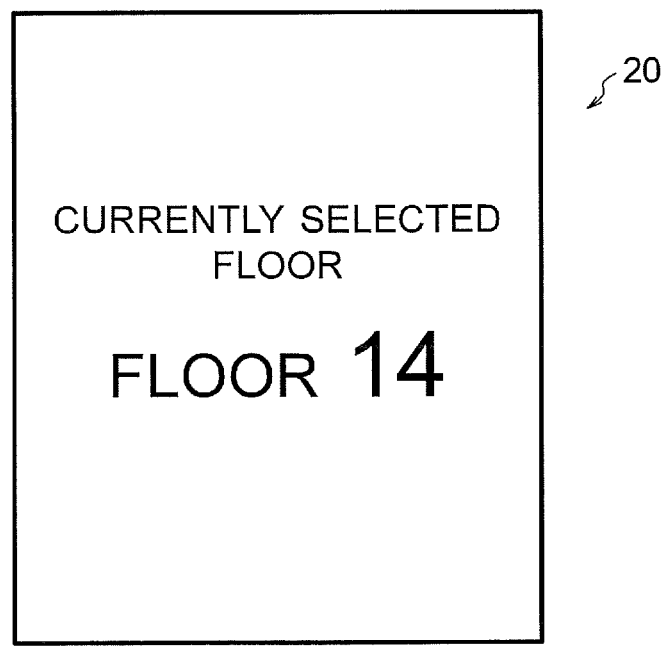
FIG. 3 is a diagram showing a display example of a touch panel in the first embodiment.
Figure 4:
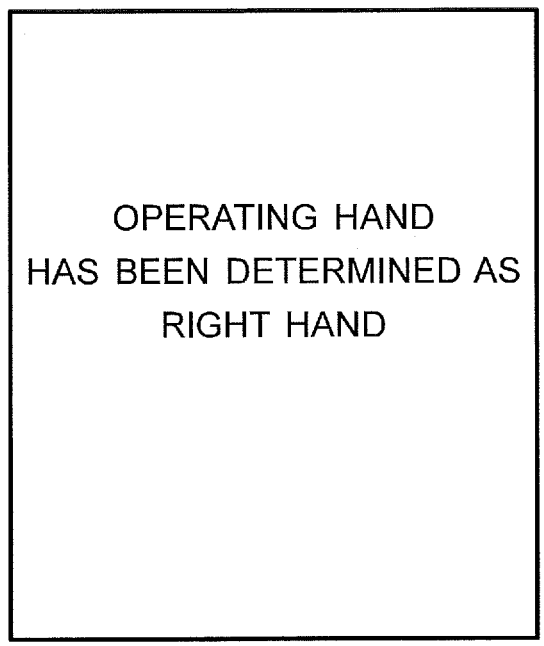
FIG. 4 is a diagram showing another display example of the touch panel in the first embodiment.
Figure 5:
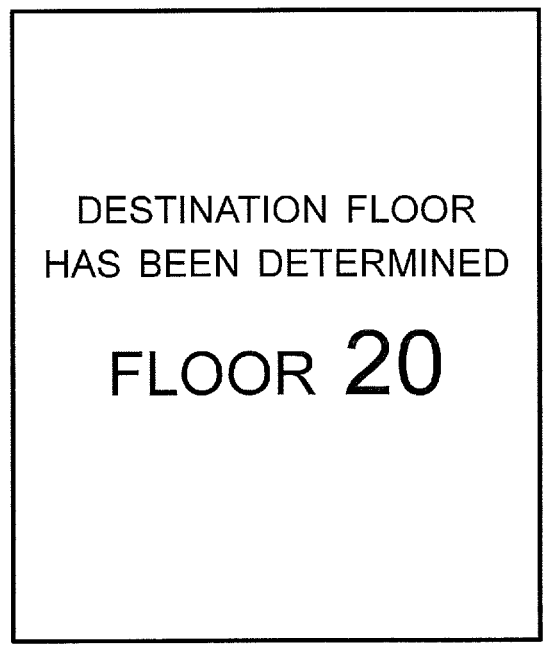
FIG. 5 is a diagram showing still another display example of the touch panel in the first embodiment.
Figure 6A:
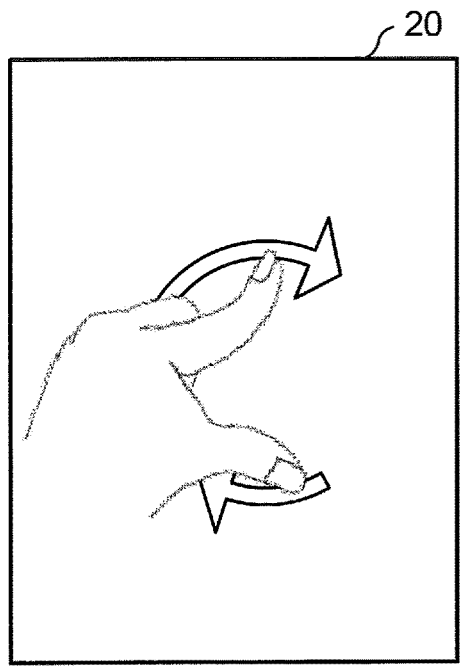
FIGS. 6(a) to 6(d) are diagrams showing rotation operations on the touch panel.
Figure 6B:
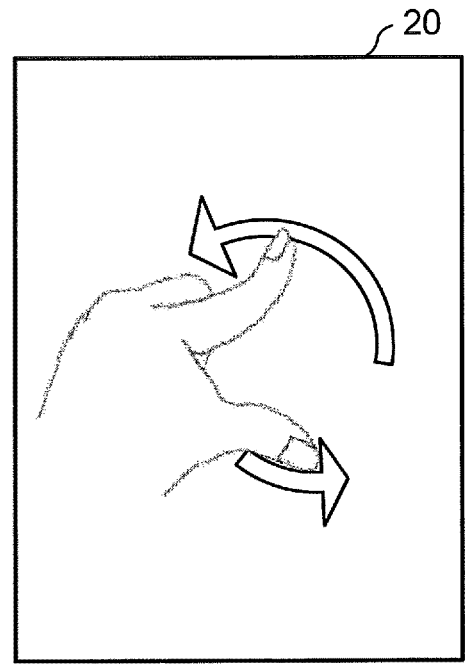
Figure 6C:
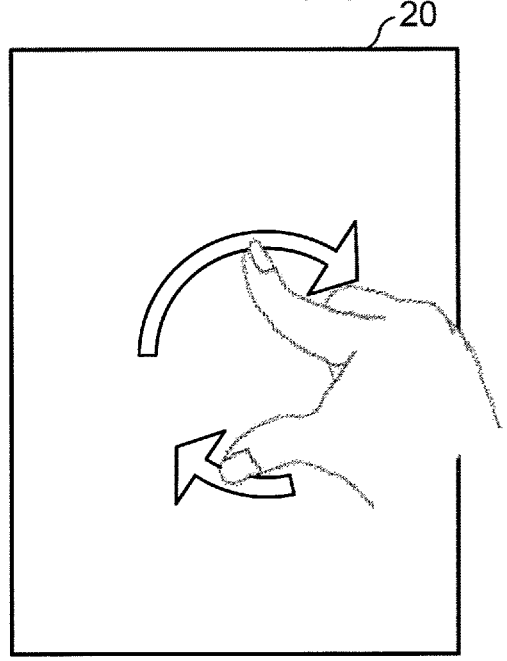
Figure 6D:
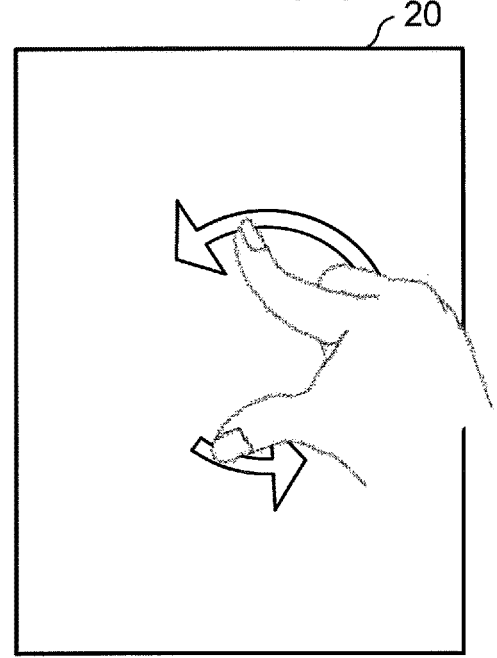

FIG. 3 is a diagram showing a display example of the operation screen of the touch panel in the first embodiment. In FIG. 3, the currently selected floor is displayed with characters on the operation screen of the touch panel 20. In the first embodiment, the user performs the touch operation on the operation screen of the touch panel 20 by using a hand 40 (normally, finger(s)). FIG. 4 shows an example of a display image displayed on the touch panel 20 when the operating hand is determined as the right hand by the operating hand determination unit 13. FIG. 5 shows an example of a display image displayed on the touch panel 20 when the selection value is determined by the selection value determination unit 17. FIGS. 6(*a*) to 6(*d*) are diagrams showing rotation operations on the touch panel 20. FIG. 6(*a*) shows the clockwise rotation operation with the left hand, FIG. 6(*b*) shows the counterclockwise rotation operation with the left hand, FIG. 6(*c*) shows the clockwise rotation operation with the right hand, and FIG. 6(*d*) shows the counterclockwise rotation operation with the right hand.

(1-2) Operation

Figure 7:
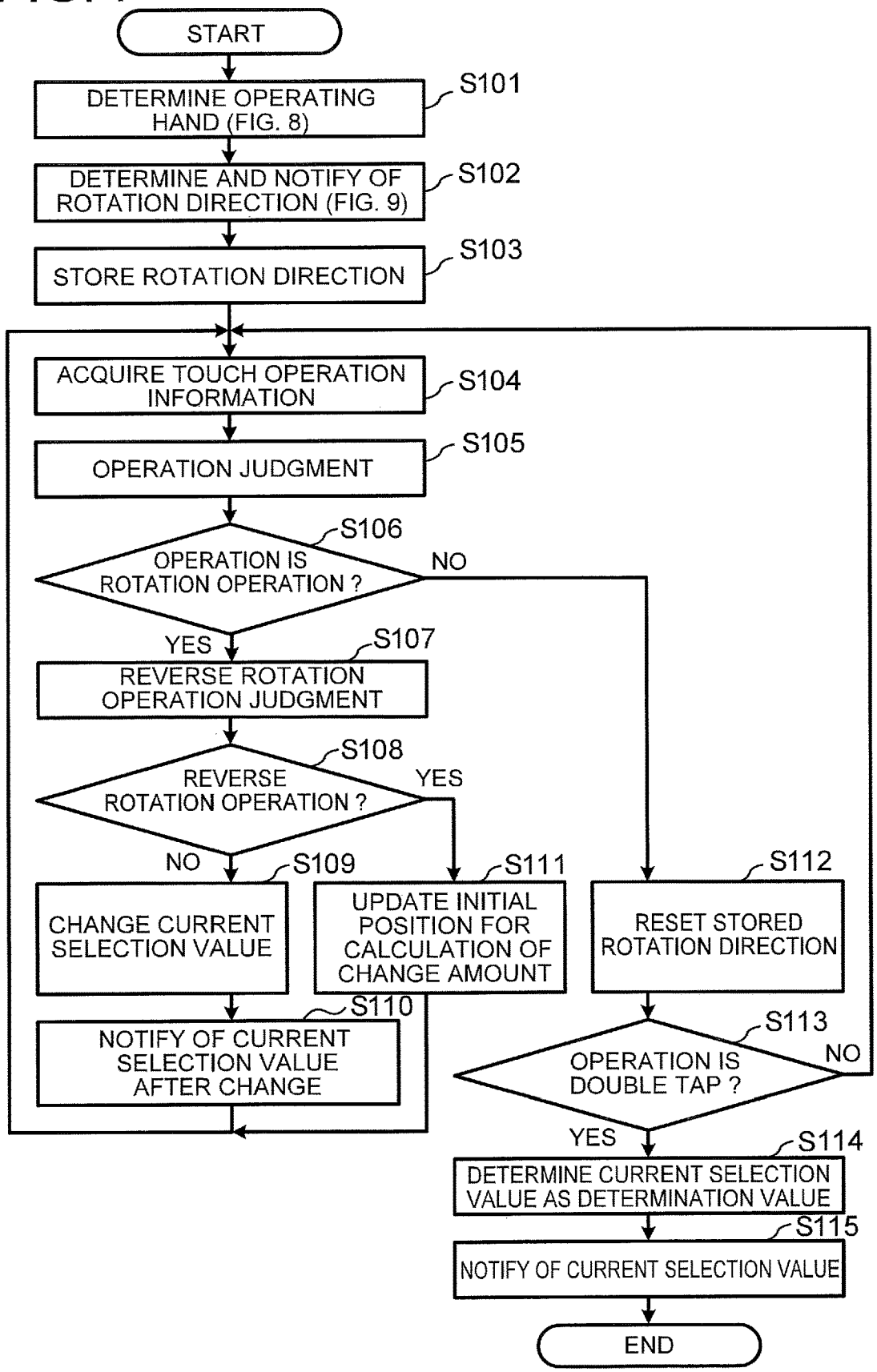
FIG. 7 is a flowchart showing the operation of the touch input judgment device according to the first embodiment.

FIG. 7 is a flowchart showing a process executed by the touch panel input device 1 and the touch input judgment device 10 according to the first embodiment.

First, in step S101 in FIG. 7, the operating hand determination unit 13 determines whether the operating hand the user uses for the rotation operation is the right hand or the left hand and supplies notification information indicating the determined operating hand (the right hand or the left hand) to the notification unit 18, and a notification signal based on the notification information is supplied from the notification unit 18 to the audio output device 43. The notification unit 18 makes the speaker of the audio output device 43 output an announcement in regard to information on the touch operation.

Figure 8:
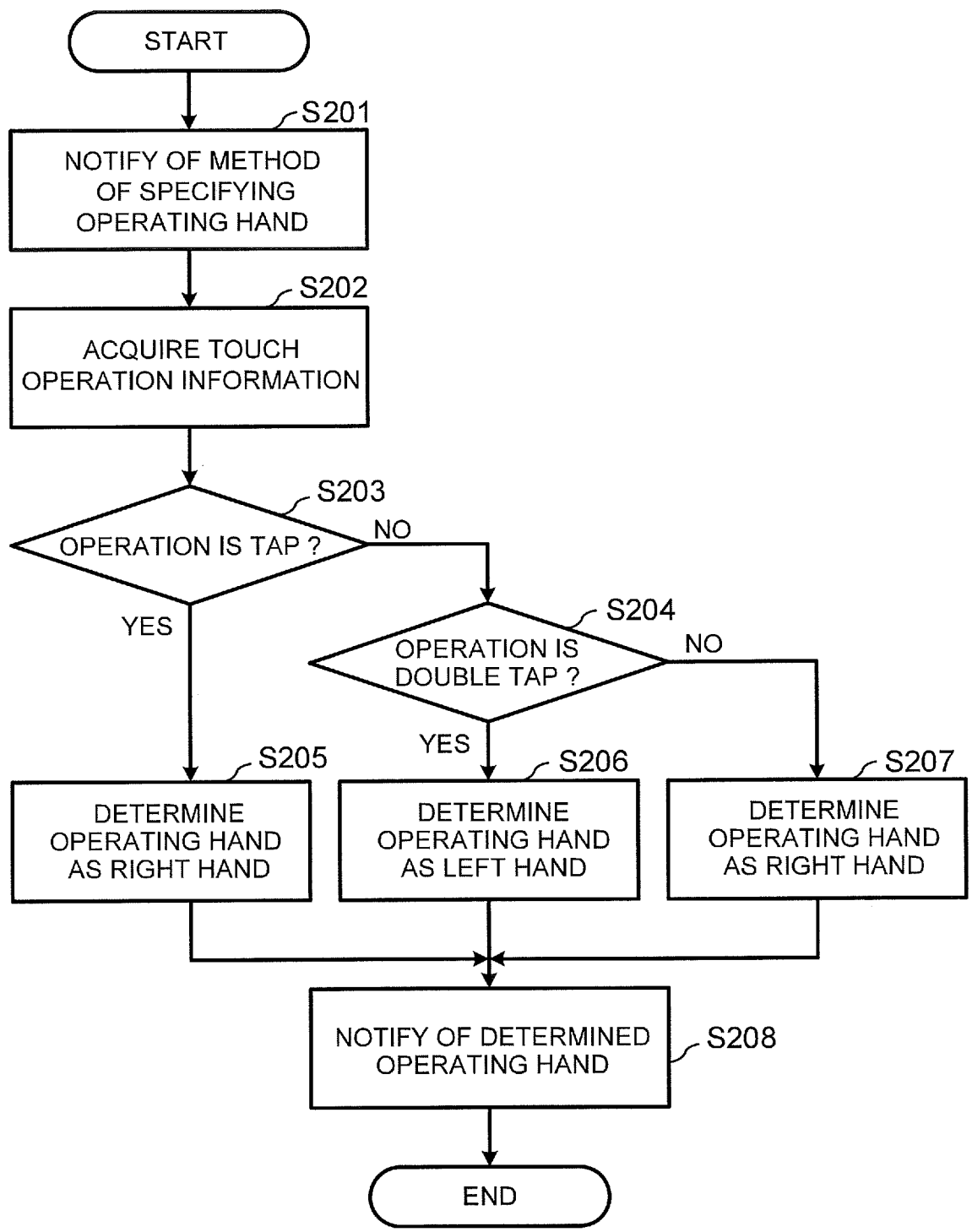
FIG. 8 is a flowchart showing the operation of an operating hand determination unit of the touch input judgment device according to the first embodiment.

The processing in the step S101 will be explained concretely by using FIG. 8. FIG. 8 is a flowchart showing a process performed by the operating hand determination unit 13 in the first embodiment.

First, the notification unit 18 notifies the user of a method of specifying the operating hand (step S201). For example, the notification unit 18 makes the audio output device 43 output an announcement of the method of specifying the operating hand by means of sound. The contents of the announcement is, for example, "The hand for operation will be determined. Tap when you want to operate with the right hand. Double tap when you want to operate with the left hand.". However, the combination of the operating hand and the operation method for determining the operating hand is not limited to the above-described example. For example, it is possible to specify the double tap as the operation method when the user wants to operate with the right hand and specify the tap as the operation method when the user wants to operate with the left hand. Alternatively, it is also possible to employ an operation other than the tap or the double tap as the operation method for determining the operating hand.

Subsequently, in step S202 in FIG. 8, the operation information input unit 11 acquires the operation information A0 based on the touch operation performed on the touch panel 20.

Subsequently, in step S203 in FIG. 8, the operation judgment unit 12 receives the signal A1 based on the operation information A0 from the operation information input unit 11 and judges whether the touch operation is the tap or not.

Subsequently, when the touch operation is judged to be the tap from the signal A1 based on the operation information A0 (YES in the step S203), the operating hand determination unit 13 determines that the operating hand is the right hand (step S205).

When the touch operation is judged not to be the tap from the signal A1 based on the operation information A0 (NO in the step S203), the operation judgement unit 12 judges whether the touch operation is the double tap or not (step S204).

When the touch operation is judged to be the double tap from the signal A1 based on the operation information A0 (YES in the step S204), the operating hand determination unit 13 determines that the operating hand is the left hand (step S206).

When the touch operation is judged not to be the double tap from the signal A1 based on the operation information A0 (NO in the step S204), the operating hand determination unit 13 determines that the operating hand is the right hand (step S207).

Finally, at least one of the notification unit 18 and the display control unit 19 outputs an audio signal or an image signal in order to notify the user of the operating hand determined in the step S205, the step S206 or the step S207 (step S208). For example, the notification unit 18 makes the audio output device output an announcement by means of sound. Alternatively, the display control unit 19 may display a message for notifying that the operating hand has been determined (e.g., FIG. 4) on the operation screen of the touch panel 20.

After the determination of the operating hand shown in the step S101 in FIG. 7, the rotation direction judgment unit 14 determines the selection value change amount, which is dependent on the rotation direction of the rotation operation, based on the information on the hand determined by the operating hand determination unit 13 and the information on the change direction of the selection value, and the notification unit 18 notifies of the rotation direction by means of sound (step S102). Further, the rotation direction judgment unit 14 stores the rotation direction information indicating the rotation direction in the storage unit 10b (step S103).

Figure 9:
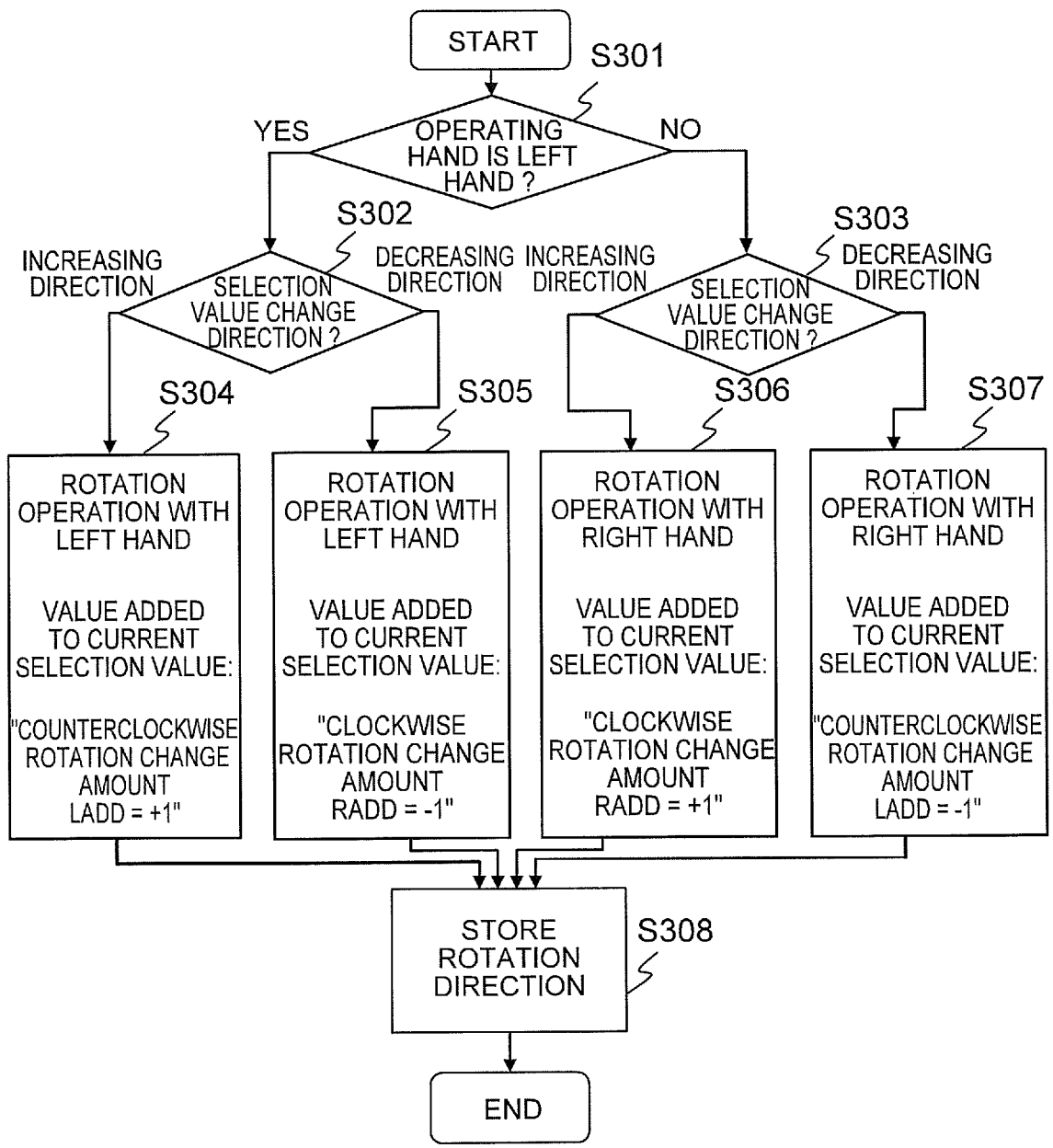
FIG. 9 is a flowchart showing the operation of a selection value change unit of the touch input judgment device according to the first embodiment.

The processing in the steps S102 and S103 in FIG. 7 will be explained concretely by using FIG. 9. FIG. 9 is a flowchart showing a process of the rotation direction judgment unit 14 in the first embodiment.

In the touch input judgment device 10, first, the operating hand determination unit 13 receives the signal A1 based on the touch operation on the touch panel 20 for determining the operating hand of the user (e.g., the tap or the double tap) and determines the operating hand indicating whether the operating hand to perform the touch operation for changing the selection value (rotation operation) is the right hand or the left hand, from the signal based on the touch operation (step S301).

Further, the rotation direction judgment unit 14 receives change direction information, indicating whether the change direction of the selection value (selected floor as the destination floor number) is an increasing direction (upward) or a decreasing direction (downward), from the elevator control device as an external device. This change direction information is information corresponding to an operation on an upward button or a downward button installed at a boarding point of the elevator performed by a potential passenger, as a person before riding the elevator, before riding the cage of the elevator. Thus, the change direction is the increasing direction when the upward button is pressed, and the change direction is the decreasing direction when the downward button is pressed.

Subsequently, when the operating hand is the left hand, the rotation direction judgment unit 14 judges whether the change direction of the selection value is increase or decrease (step S302).

When the change direction of the selection value is increase, the rotation direction judgment unit 14 determines the counterclockwise rotation change amount LADD as the change amount in the case of the counterclockwise rotation operation as "+1" and stores the determined value in the storage unit 10b (step S304).

When the change direction of the selection value is decrease, the rotation direction judgment unit 14 determines the clockwise rotation change amount RADD as the change amount in the case of the clockwise rotation operation as "−1" and stores the determined value in the storage unit 10b (step S305).

As above, when the operating hand is the left hand, the rotation direction judgment unit 14 determines the counterclockwise rotation change amount LADD as "+1" or determines the clockwise rotation change amount RADD as "−1", for example.

Subsequently, when the operating hand is the right hand, the rotation direction judgment unit 14 judges whether the change direction of the selection value is increase or decrease (step S303).

When the change direction of the selection value is increase, the rotation direction judgment unit 14 determines the clockwise rotation change amount RADD as the change amount in the case of the clockwise rotation operation as "+1" and stores the determined value in the storage unit 10b (step S306).

When the change direction of the selection value is decrease, the rotation direction judgment unit 14 determines the counterclockwise rotation change amount LADD as the change amount in the case of the counterclockwise rotation operation as "−1" and stores the determined value in the storage unit 10b (step S307).

As above, when the operating hand is the right hand, the rotation direction judgment unit 14 determines the counterclockwise rotation change amount LADD as "−1" or determines the clockwise rotation change amount RADD as "+1", for example.

For example, when the operating hand determined by the operating hand determination unit 13 is the right hand and the destination direction of the elevator as the change direction of the selection value is an upper floor, the rotation direction judgment unit 14 determines that the clockwise rotation change amount RADD is "+1".

Subsequently, in step S104 in FIG. 7, the operation information input unit 11 acquires the operation information A0 from the touch panel 20.

Subsequently, in step S105 in FIG. 7, the operation judgment unit 12 judges the type of the operation and the operation amount from the signal A1 based on the operation information A0 acquired from the operation information input unit 11.

Subsequently, in step S106 in FIG. 7, when the type of the operation is the rotation operation, the process advances to step S107. When the type of the operation is not the rotation operation, the process advances to step S112.

In steps S107 and S108 in FIG. 7, the reverse-rotation direction judgment unit 15 judges whether the inputted rotation operation is the reverse rotation operation or not.

Figure 10:
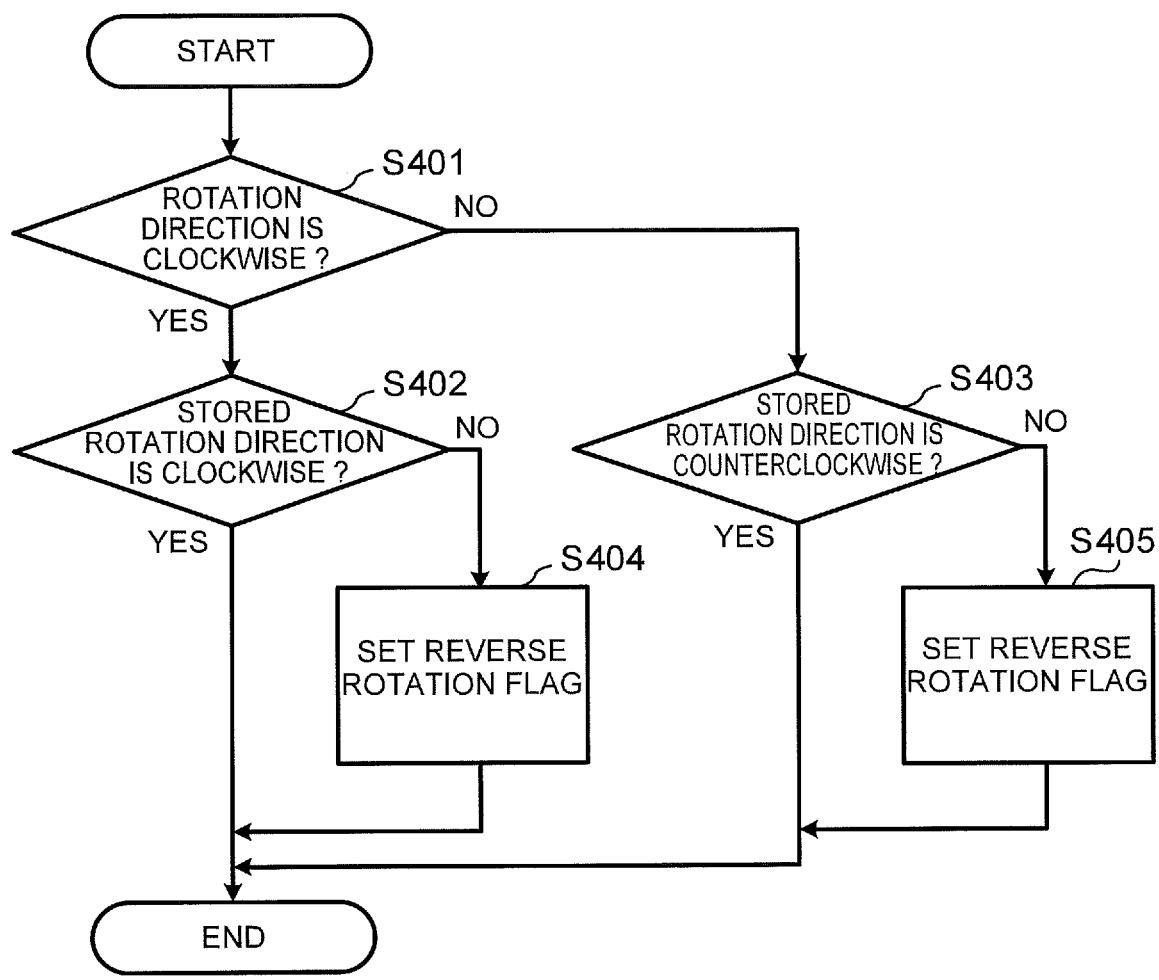
FIG. 10 is a flowchart showing the operation of a reverse-rotation direction judgment unit of the touch input judgment device according to the first embodiment.

Details of the processing in the steps S107 and S108 are shown in FIG. 10. FIG. 10 is a flowchart showing a process of the reverse-rotation direction judgment unit 15 in the first embodiment.

First, the reverse-rotation direction judgment unit 15 judges whether the current rotation operation is the clockwise rotation operation or not (step S401), and advances the process to step S402 when the current rotation operation is the clockwise rotation operation (YES in the step S401) or advances the process to step S403 when the current rotation operation is not the clockwise rotation operation (NO in the step S401).

When the current rotation operation is the clockwise rotation operation (YES in the step S401), the reverse-rotation direction judgment unit 15 judges whether the rotation direction according to the stored rotation direction information is the clockwise rotation direction or not (step S402), and ends the process when the stored rotation direction is the clockwise rotation direction (YES in the step S402) or advances the process to step S404 when the stored rotation direction is not clockwise (NO in the step S402). When the rotation direction according to the stored rotation direction information is not the clockwise rotation direction (NO in the step S402), the reverse-rotation direction judgment unit 15 sets a reverse direction rotation flag and stores the reverse direction rotation flag in the storage unit 10b (step S404).

When the current rotation operation is not the clockwise rotation operation (NO in the step S401), the reverse-rotation direction judgment unit 15 judges whether the rotation direction according to the stored rotation direction information is the counterclockwise rotation direction or not (step S403), and ends the process when the rotation direction according to the stored rotation direction information is the counterclockwise rotation direction (YES in the step S403) or advances the process to step S405 when the rotation direction according to the stored rotation direction information is not the counterclockwise rotation direction (NO in the step S403). When the rotation direction according to the stored rotation direction information is not the counterclockwise rotation direction, the reverse-rotation direction judgment unit 15 sets the reverse direction rotation flag and stores the reverse direction rotation flag in the storage unit 10b (step S405).

Subsequently, the process advances to step S109 in FIG. 7 when the rotation direction is not the reverse direction rotation, or the process advances to step S111 when the rotation direction is the reverse direction rotation (step S108).

Figure 11:
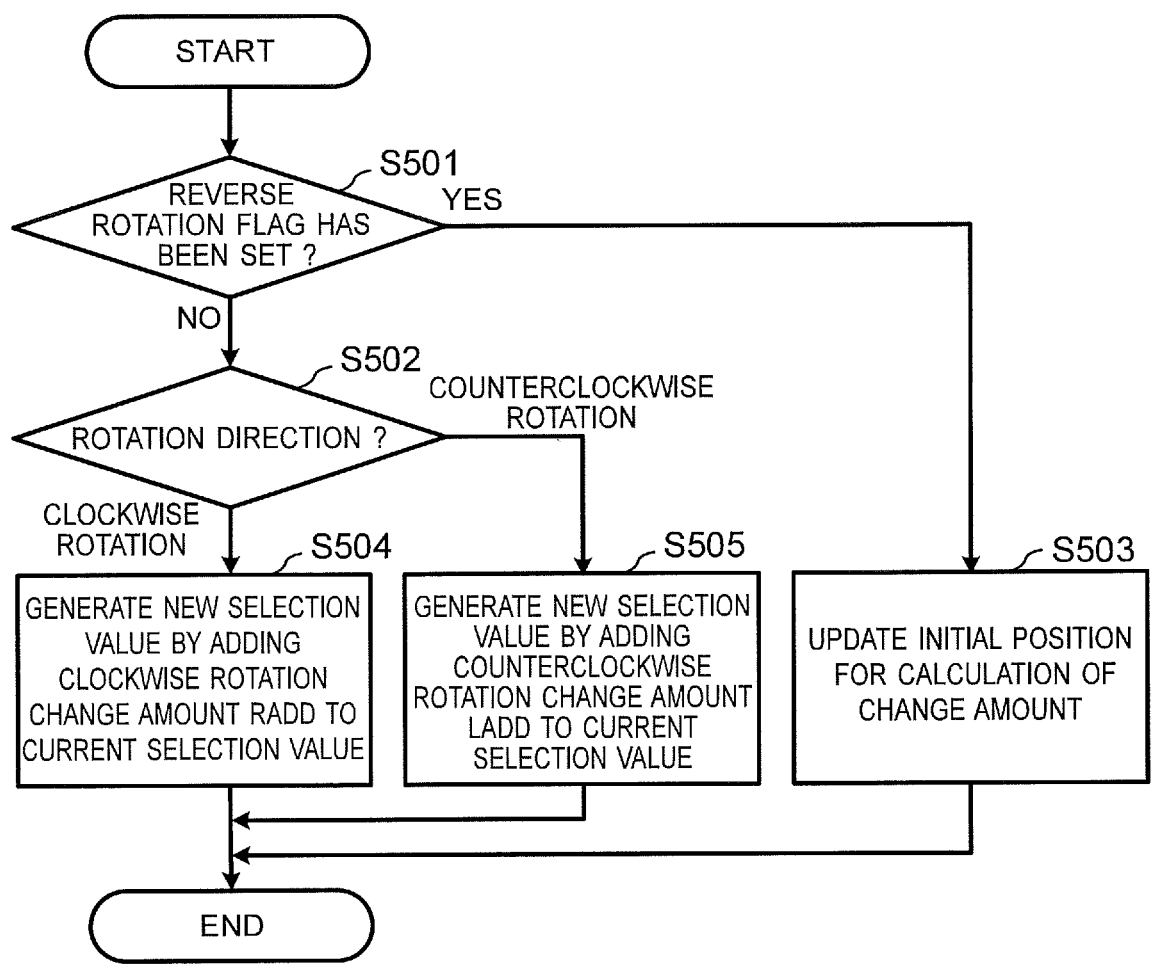
FIG. 11 is a flowchart showing the operation of a selection value change unit of the touch input judgment device according to the first embodiment.

The processing in the step S111 in FIG. 7 will be explained with reference to FIG. 11. FIG. 11 is a flowchart showing a process of the selection value change unit 16 in the first embodiment.

First, the selection value change unit 16 judges whether the reverse direction rotation flag has been set or not, and advances the process to step S502 when the reverse direction rotation flag has not been set (NO in step S501) or advances the process to step S503 when the reverse direction rotation flag has been set (YES in the step S501).

When the reverse direction rotation flag has not been set (NO in the step S501), the selection value change unit 16 judges whether the direction of the rotation operation acquired from the operation judgment unit 12 is clockwise rotation or not, and advances the process to step S504 when the rotation operation is clockwise rotation (CLOCKWISE ROTATION in the step S502) or advances the process to step S505 when the rotation operation is counterclockwise rotation (COUNTERCLOCKWISE ROTATION in the step S502).

When the rotation operation is clockwise rotation (CLOCKWISE ROTATION in the step S502), the selection value change unit 16 generates a new current selection value SELFLR by adding the clockwise rotation change amount RADD to the current selection value SELFLR (step S504). For example, if the current selection value SELFLR is "14" and the clockwise rotation change amount RADD is "+1", the new current selection value SELFLR is "15" (=14+1). Namely, when the current selection value is regarded as the currently selected floor number and the clockwise rotation change amount RADD is regarded as a floor number change amount in the case of clockwise rotation, the currently selected floor is "floor 14" and a new currently selected floor is set to "floor 15" by performing the clockwise rotation operation on the touch panel 20.

When the rotation operation is counterclockwise rotation (COUNTERCLOCKWISE ROTATION in the step S502), a new current selection value SELFLR is generated by adding the counterclockwise rotation change amount LADD to the current selection value SELFLR (step S505). For example, if the current selection value SELFLR is "14" and the counterclockwise rotation change amount LADD is "−1", the new current selection value SELFLR is "13" (=14−1). Namely, when the current selection value is regarded as the currently selected floor number and the counterclockwise rotation change amount LADD is regarded as the floor number change amount in the case of counterclockwise rotation, the currently selected floor is "floor 14" and a new currently selected floor is set to "floor 13" by performing the counterclockwise rotation operation on the touch panel 20.

When the reverse direction rotation flag has been set in the step S501, the initial position to be used for the calculation of the change amount is updated to the current touch position (step S503).

In the step S112 in FIG. 7, the operation judgment unit 12 of the control unit 10a resets the rotation direction stored in the storage unit 10b.

In the next step S113, the operation judgment unit 12 advances the process to step S114 when the type of the operation is the double tap or returns the process to the step S104 when the type of the operation is not the double tap.

In the step S114, the selection value determination unit 17 determines (finalizes) the current selection value as a determination value. For example, the currently selected floor is determined as the destination floor by performing the double tap on the touch panel 20 of the destination floor registration device of the elevator.

In the next step S115, the display control unit 19 displays information indicating that the selection value has been determined (FIG. 5) on the operation screen of the display panel unit (display device) 22, and the notification unit 18 notifies that the selection value has been determined by means of sound by using the audio output device 43.

(1-3) Effect

As described above, by applying the touch input judgment device 10, the touch panel input device 1, the touch input judgment method or the touch input judgment program according to the first embodiment to a destination floor registration device of an elevator, for example, the selection value representing the destination floor number does not decrease even when the return operation of rotating fingers in the reverse direction is performed in the state in which a plurality of fingers are in contact with the touch panel 20. Therefore, the return operation in the reverse direction (e.g., the counterclockwise rotation direction) occurring when the rotation operation in the normal direction (e.g., the clockwise rotation direction) is performed repeatedly, can be carried out while keeping the fingers in contact with the touch panel 20. Accordingly, the user can repeat the rotation operation in the normal direction with ease and quickly, and quick and comfortable floor number designation becomes possible. Incidentally, similar advantages can be obtained also when the normal direction is the counterclockwise rotation direction.

(2) Second Embodiment

(2-1) Configuration

In the first embodiment described above, when a finger is temporarily separated from the touch panel 20 in the middle of the rotation operation of moving a plurality of fingers while keeping the fingers in contact with the touch panel 20 and thereafter the separated finger touches the touch panel 20 again and moves, there is a possibility that the movement after touching the touch panel 20 again is misjudged as a new rotation operation or a reverse direction rotation.

In a second embodiment of the present invention, a description will be given of a method capable of appropriately judging whether the rotation operations before and after the separation of a finger constitute a continuous rotation operation or are different rotation operations in the case where a finger is separated from the touch panel 20 in the middle of the rotation operation of moving a plurality of fingers while keeping the fingers in contact with the touch panel 20 and thereafter the separated finger touches the touch panel 20 again and moves.

Figure 12:
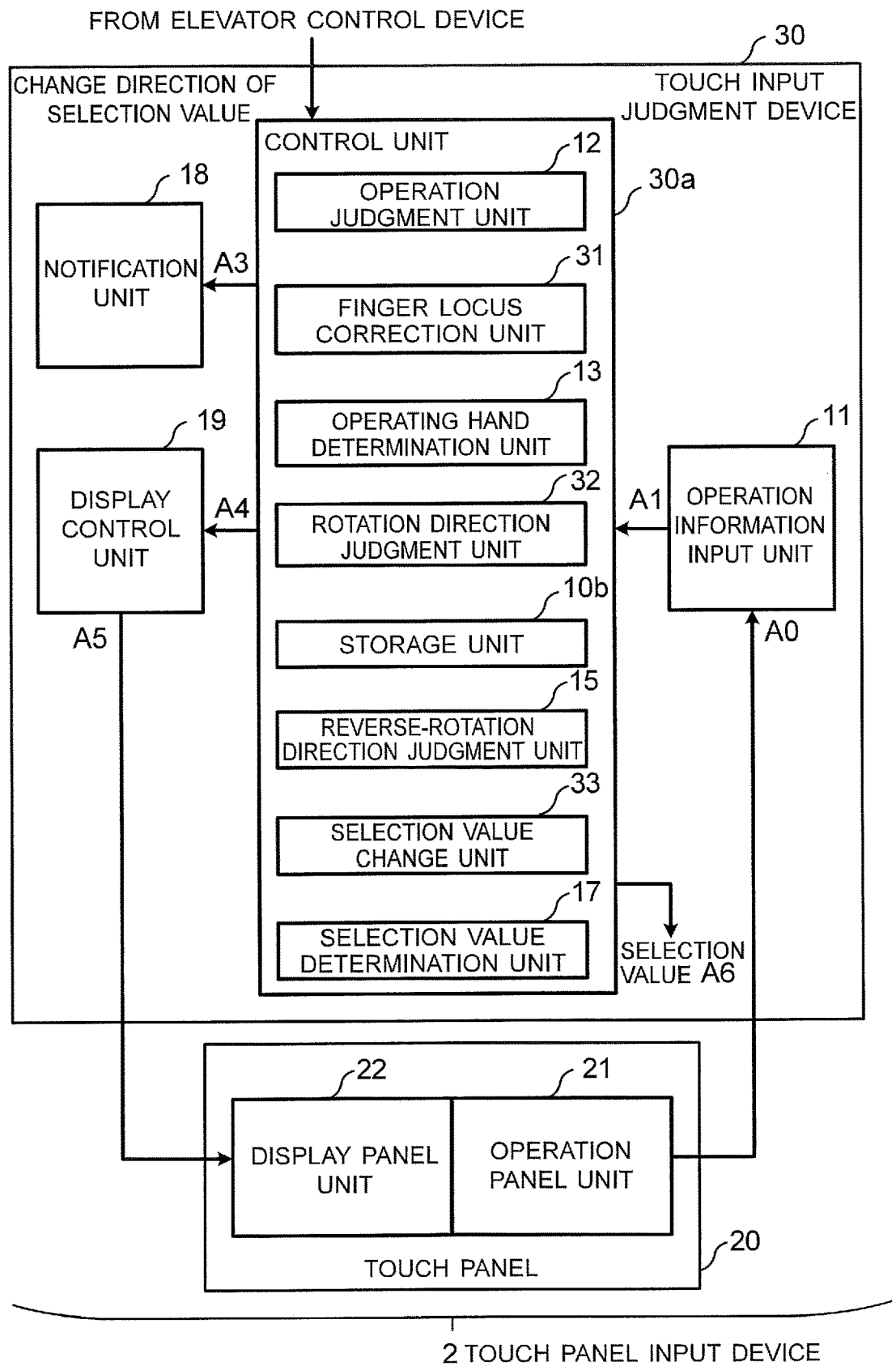
FIG. 12 is a functional block diagram schematically showing the configuration of a touch panel input device (including a touch input judgment device) according to a second embodiment of the present invention.

FIG. 12 is a functional block diagram schematically showing the configuration of a touch panel input device 2 (including a touch input judgment device 30) according to the second embodiment. In FIG. 12, components identical or similar to those shown in FIG. 1 are assigned the same reference characters as in FIG. 1.

As shown in FIG. 12, the touch input judgment device 30 according to the second embodiment differs from the touch input judgment device 10 according to the first embodiment in that a control unit 30a includes a finger locus correction unit 31, a rotation direction judgment unit 32 and a selection value change unit 33.

In the case where a finger is temporarily separated from the touch panel 20 in the middle of the rotation operation of moving a plurality of fingers while keeping the fingers in contact with the touch panel 20 and thereafter the separated finger touches the touch panel 20 again and moves, the finger locus correction unit 31 judges whether the finger rotation operations before and after the separation of the finger are two rotation operations different from each other or the same continuous rotation operation, based on loci of the movement of the finger before and after the separation of the finger. When judging that it is the latter case, the finger locus correction unit 31 corrects the locus.

When the locus of a finger is corrected by the finger locus correction unit 31, the rotation direction judgment unit 32 performs the operation of the rotation direction judgment unit 14 in the first embodiment based on the corrected locus of the finger.

When the locus of a finger is corrected by the finger locus correction unit 31, the selection value change unit 33 determines the increase or decrease of the selection value by the rotation operation based on the corrected locus of the finger.

(2-2) Operation

Figure 13:
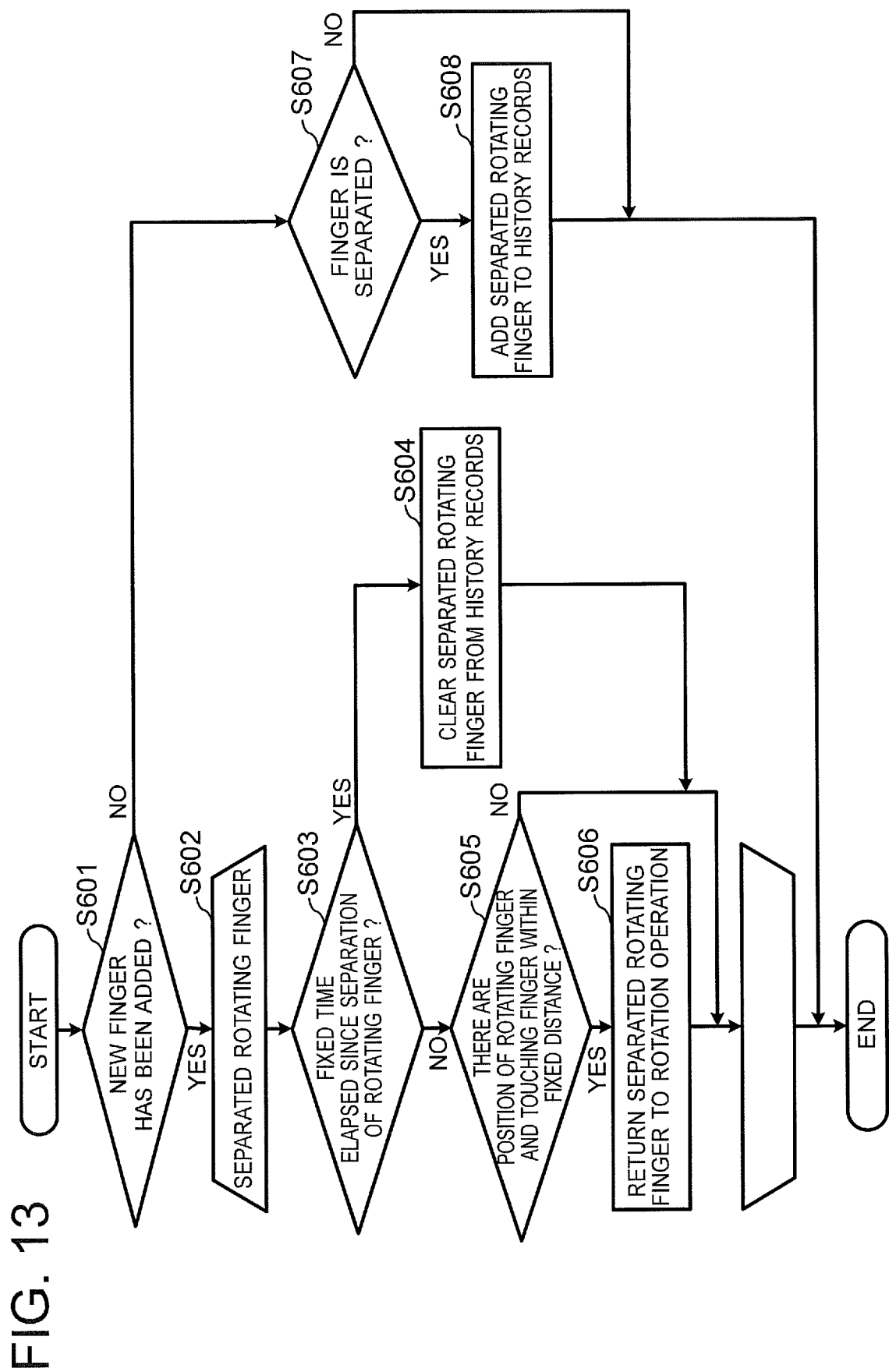
FIG. 13 is a flowchart showing the operation of a finger locus correction unit of the touch input judgment device according to the second embodiment.

FIG. 13 is a flowchart showing the operation of the finger locus correction unit 31.

In step S601, the finger locus correction unit 31 judges whether or not there was new contact of a finger with the touch panel 20 (i.e., whether or not a new finger was added), and advances the process to step S602 when there was new contact of a finger (YES in the step S601) or advances the process to step S607 otherwise (NO in the step S601).

In the step S602, the finger locus correction unit 31, holding history information on fingers that was separated from the touch panel 20 in a predetermined fixed time from the present time point towards the past, judges whether or not the finger that newly touched the touch panel 20 in the step S601 is a finger that was temporarily separated from the touch panel 20 in the middle of the rotation operation, touched the touch panel 20 again and returned to the rotation operation.

In step S603, according to the finger history information, the finger locus correction unit 31 judges whether or not a measurement time from a first time point when the finger was separated in the middle of the rotation operation to a second time point when there was new contact of a finger with the touch panel 20 in the step S601 exceeds a predetermined fixed time (threshold value). The process advances to step S604 when the measurement time exceeds the fixed time (YES in the step S603) or to step S605 when the measurement time is within the fixed time (NO in the step S603).

In the step S604, the finger locus correction unit 31 clears history records about a finger that has been separated from the touch panel 20 for a time period exceeding the fixed time, from the finger history information.

In the step S605, according to the finger history information, the finger locus correction unit 31 judges whether or not a measurement distance from a first position where the finger was separated in the middle of the rotation operation to a second position where there was new contact of a finger with the touch panel 20 in the step S601 is within a predetermined fixed distance (threshold value). When the measurement distance is within the fixed distance (YES in the step S605), the process advances to step S606. When the measurement distance exceeds the fixed distance (NO in the step S605), the loop process from the step S602 to the step S606 is performed for another finger that was separated in the fixed time.

In the step S606, when the measurement time during which the finger has been separated from the touch panel 20 is within the fixed time and the measurement distance from the position where the finger separated from the touch panel 20 to the position where the finger touched the touch panel 20 is within the fixed distance, the finger locus correction unit 31 judges that the finger that touched the touch panel 20 again is a finger that returned to the rotation operation. Namely, the rotation operations before and after the separation of the finger are judged to constitute one rotation operation.

In the step S607, the finger locus correction unit 31 judges whether or not a finger was separated from the touch panel 20 and advances the process to step S608 when a finger was separated. Otherwise, the correction process by the finger locus correction unit 31 is ended.

In the step S608, the finger locus correction unit 31 adds information on the finger separated from the touch panel 20 (time, position, etc.) to the history records.

Figures 14, 15:
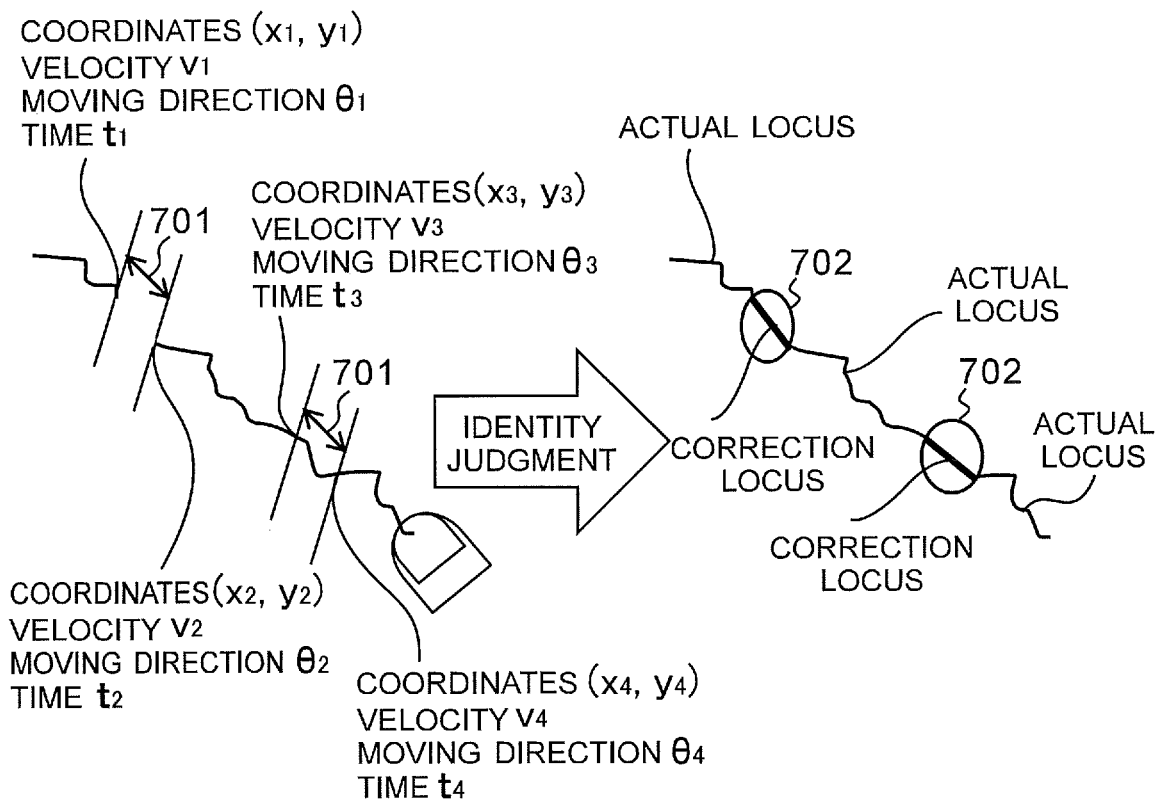
FIG. 14 is a diagram showing an example of information stored by the finger locus correction unit of the touch input judgment device according to the second embodiment in a tabular format.
FIG. 15 is an explanatory drawing showing the operation of the finger locus correction unit of the touch input judgment device according to the second embodiment.

FIG. 14 is a diagram showing an example of the finger history information stored by the finger locus correction unit 31 in a tabular format. As shown in FIG. 14, the history information includes an x coordinate and a y coordinate at the time of the finger separation in the step S608, a velocity v at the time of the finger separation in the step S608, a moving direction θ at the time of the finger separation in the step S608, and a time t at the time of the finger separation in the step S608. The time is obtained by a time measurement means (e.g., timer) installed in the control unit 30a or the like. In FIG. 14, n is an integer larger than or equal to 1. The x coordinate and the y coordinate in FIG. 14 can be used for the closeness judgment of the finger position in the step S605, and the time t can be used for the judgment on whether the fixed time has passed since the separation of the finger.

The velocity v and the moving direction θ can be used, for example, in the closeness judgment of the finger position in the step S605 for expecting a locus of the separated finger based on the velocity and the moving direction and judging whether the added finger is at a position close to the expected coordinates. In the step S608, a new line is added to the history records when a finger was separated. In the step S604, the history information on the corresponding finger is deleted when the fixed time elapsed.

The judgment is made on whether the measurement distance to the second position where the new finger touches the touch panel 20 in the step S601 is within the predetermined fixed distance (threshold value) or not. When the measurement distance is within the fixed distance (YES in the step S605), the process advances to the step S606. When the measurement distance exceeds the fixed distance (NO in the step S605), the loop process from the step S602 to the step S606 is performed for another finger that was separated in the fixed time.

FIG. 15 is an explanatory drawing showing the operation of the finger locus correction unit 31 of the touch input judgment device 30 according to the second embodiment. Based on the finger locus information shown in FIG. 14, by use of information at the time when a finger was separated from the touch panel 20 in the middle of the rotation operation (e.g., $(x_1, y_1, v_1, \theta_1, t_1)$ and $(x_3, y_3, v_3, \theta_3, t_3)$) and information at the time when a finger touched the touch panel 20 (e.g., $(x_2, y_2, v_2, \theta_2, t_2)$ and $(x_4, y_4, v_4, \theta_4, t_4)$), even when discontinuous parts (breaks) 701 occurred in the actual locus in the middle of a finger movement like the one shown in FIG. 15, the breaks in the actual locus can be connected by using correction loci 702. The control unit 30a executes the process while regarding the locus including the correction loci 702 as the actual locus.

(2-3) Effect

As described above, by applying the touch input judgment device 30, the touch panel input device 2, the touch input judgment method or the touch input judgment program according to the second embodiment to a destination floor registration device of an elevator, for example, the following advantages are obtained in addition to the advantages described in the first embodiment: According to the second embodiment, even when a discontinuous part 701 occurred in the actual locus in the middle of a finger movement, the break in the actual locus can be connected by using the correction locus 702. Therefore, in the case where a finger is temporarily separated from the touch panel 20 in the middle of the rotation operation of moving a plurality of fingers while keeping the fingers in contact with the touch panel 20 and thereafter the separated finger touches the touch panel 20 again and moves, the movement after touching the touch panel 20 again can be prevented from misjudged as a new rotation operation or a reverse direction rotation. Accordingly, the user can repeat the rotation operation in the normal direction with ease and quickly, and quick and comfortable floor number designation becomes possible.

(3) Modification

In the first and second embodiments, it is possible to set the absolute value of the selection value change amount (RADD, LADD) to be larger with the increase in the number of touch points touching the touch panel 20. By using the finger history information shown in the second embodiment, it is possible to appropriately judge whether the increase/decrease of the touch points touching the touch panel 20 represents temporary separation of a finger in the middle of the rotation operation or an operation of intentionally increasing the number of fingers touching the touch panel 20.

DESCRIPTION OF REFERENCE CHARACTERS 1, 2: touch panel input device, 10, 30: touch input judgment device, 10a, 30a: control unit, 10b: storage unit, 11: operation information input unit, 12: operation judgment unit, 13: operating hand determination unit, 14, 32: rotation direction judgment unit, 15: reverse-rotation direction judgment unit, 16, 33: selection value change unit, 17: selection value determination unit, 18: notification unit, 19: display control unit, 20: touch panel, 31: finger locus correction unit, 41: processor, 42: memory, 43: audio output device, 701: discontinuous part, 702: correction locus.

What is claimed is:

1. A touch input judgment method to be executed by a touch input judgment device that changes a selection value based on a touch operation on a touch panel, the touch input judgment method comprising:

determining a selection value change amount, to be added to a current selection value, when a rotation operation in a normal direction is inputted through the touch panel and storing rotation direction information indicating the normal direction in a storage when a rotation operation in the normal direction as a first rotation operation is performed;

judging that a rotation operation subsequent to the first rotation operation is a return operation of a finger position when the subsequent rotation operation is a finger movement in a direction reverse to the direction indicated by the rotation direction information;

setting a new current selection value after a change to a value obtained by adding the selection value change amount to the current selection value when the subsequent rotation operation is a rotation operation in the normal direction and maintaining the current selection value without change when the subsequent rotation operation is judged to be the return operation of the finger position; and determining the current selection value according to the touch operation on the touch panel.

2. A computer readable medium storing a touch input judgment program for causing a computer to execute a touch input judgment method of changing and determining a selection value based on a touch operation on a touch panel, wherein the touch input judgment program causes the computer to execute:

a process of determining a selection value change amount, to be added to a current selection value, when a rotation operation in a normal direction is inputted through the touch panel and storing rotation direction information indicating the normal direction in a storage unit when a rotation operation in the normal direction as a first rotation operation is performed;

a process of judging that a rotation operation subsequent to the first rotation operation is a return operation of a finger position when the subsequent rotation operation is a finger movement in a direction reverse to the direction indicated by the rotation direction information;

a process of setting a new current selection value after a change to a value obtained by adding the selection value change amount to the current selection value when the subsequent rotation operation is a rotation operation in the normal direction and maintaining the current selection value without change when the subsequent rotation operation is judged to be the return operation of the finger position; and a process of determining the current selection value according to the touch operation on the touch panel.

3. A touch input judgment device that changes a selection value based on a touch operation on a touch panel, the touch input judgment device comprising:

a processor to execute a program; and a memory to store the program which, when executed by the processor, performs a process of determining a selection value change amount, to be added to a current selection value, when a rotation operation in a normal direction is inputted through the touch panel and storing rotation direction information indicating the normal direction in the memory when a rotation operation in the normal direction as a first rotation operation is performed;

a process of judging that a rotation operation subsequent to the first rotation operation is a return operation of a finger position when the subsequent rotation operation is a finger movement in a direction reverse to the direction indicated by the rotation direction information;

a process of setting a new current selection value after a change to a value obtained by adding the selection value change amount to the current selection value when the subsequent rotation operation is a rotation operation in the normal direction and maintaining the current selection value without change when the subsequent rotation operation is judged to be the return operation of the finger position; and a process of determining the current selection value according to the touch operation on the touch panel.

4. The touch input judgment device according to claim 3, wherein the normal direction is a direction coinciding with a change direction of the selection value inputted from outside.

5. The touch input judgment device according to claim 3, wherein when the subsequent rotation operation is judged to be the return operation of the finger position, the program, when executed by the processor, further performs a process of storing a position of a finger, which is in contact with the touch panel, in the memory as an initial position of a next rotation operation in the normal direction.

6. The touch input judgment device according to claim 3, wherein the program, when executed by the processor, further performs a process of judging a type of the touch operation, wherein the rotation direction information is cleared when the touch operation inputted when the rotation direction information has been stored in the memory is an operation other than a rotation operation.

7. The touch input judgment device according to claim 3, wherein the program, when executed by the processor, further performs a process of acquiring locus information on a finger movement on the touch panel, detecting a discontinuous part of a locus indicated by the locus information, and correcting the locus by adding a correction locus that connects the discontinuous part; and a process of judging a rotation direction of the rotation operation based on the corrected locus and changing the current selection value based on the corrected locus.

8. A touch panel input device comprising:

a touch panel that receives a touch operation; and a touch input judgment device that changes and determines a selection value based on the touch operation, the touch input judgment device including:

a processor to execute a program; and a memory to store the program which, when executed by the processor, performs a process of determining a selection value change amount, to be added to a current selection value, when a rotation operation in a normal direction is inputted through the touch panel and storing rotation direction information indicating the normal direction in the memory when a rotation operation in the normal direction as a first rotation operation is performed;

a process of judging that a rotation operation subsequent to the first rotation operation is a return operation of a finger position when the subsequent rotation operation is a finger movement in a direction reverse to the direction indicated by the rotation direction information;

a process of setting a new current selection value after a change to a value obtained by adding the selection value change amount to the current selection value when the subsequent rotation operation is a rotation operation in the normal direction and maintaining the current selection value without change when the subsequent rotation operation is judged to be the return operation of the finger position; and a process of determining the current selection value according to the touch operation on the touch panel.

* * * * *